United States Patent
Hsu et al.

(10) Patent No.: US 9,309,705 B2
(45) Date of Patent: *Apr. 12, 2016

(54) DUAL-SHAFT SYNCHRONOUS TRANSMISSION FIXING DEVICE

(71) Applicant: FIRST DOME CORPORATION, New Taipei (TW)

(72) Inventors: An Szu Hsu, New Taipei (TW); Wang Jui Lee, New Taipei (TW); Chung Yi Lin, New Taipei (TW); Ya Ching Lin, New Taipei (TW)

(73) Assignee: First Dome Corporation, New Taipei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 14/473,083

(22) Filed: Aug. 29, 2014

(65) Prior Publication Data
US 2016/0032633 A1    Feb. 4, 2016

(30) Foreign Application Priority Data
Jul. 31, 2014    (TW) .............................. 103126306 A

(51) Int. Cl.
| | |
|---|---|
| *E05D 7/00* | (2006.01) |
| *E05D 3/06* | (2006.01) |
| *E05D 3/12* | (2006.01) |
| *G06F 1/16* | (2006.01) |

(52) U.S. Cl.
CPC .............. *E05D 3/122* (2013.01); *G06F 1/1681* (2013.01)

(58) Field of Classification Search
CPC ............. E05D 3/12; E05D 3/122; E05D 3/06; E05D 3/10; E05D 11/087; G06F 1/1681; G06F 1/1616; G06F 1/1618; G06F 1/168; E05Y 2900/606; E05Y 2900/602; H04M 1/0216; H04M 1/0222; H04M 1/022; H05K 5/0226; Y10T 16/547; Y10T 16/5837; Y10T 16/53864; Y10T 16/541; Y10T 16/540255; Y10T 16/533; Y10T 16/5938
See application file for complete search history.

(56) References Cited

U.S. PATENT DOCUMENTS

| | | | | |
|---|---|---|---|---|
| 6,176,044 | B1 * | 1/2001 | Nixon ................... | E05F 15/614 49/334 |
| 2005/0050686 | A1 * | 3/2005 | Kurokawa ............. | G06F 1/1618 16/354 |
| 2006/0238968 | A1 * | 10/2006 | Maatta ................ | H04M 1/0218 361/679.01 |
| 2011/0289728 | A1 * | 12/2011 | Wang ...................... | E05D 3/122 16/337 |
| 2013/0016489 | A1 * | 1/2013 | Yeh ........................ | G06F 1/1681 361/807 |
| 2013/0318746 | A1 * | 12/2013 | Kuramochi ........... | G06F 1/1681 16/342 |
| 2014/0251045 | A1 * | 9/2014 | Hsu ........................ | G06F 1/1681 74/96 |
| 2014/0360296 | A1 * | 12/2014 | Hsu ........................ | E05D 3/122 74/98 |

(Continued)

*Primary Examiner* — Chuck Mah
(74) *Attorney, Agent, or Firm* — Rosenberg, Klein & Lee

(57) ABSTRACT

A dual-shaft synchronous transmission fixing device has a simplified structure and minified volume. The gap between the rotary shafts can be changed or adjusted according to the transmission specification so that the electronic device can be thinned and lightweight. The fixing device includes a driver and a reactor respectively disposed on a first shaft and a second shaft and a link unit engaged with the driver and the reactor, whereby the first and second shafts can be synchronously rotated. The fixing device further includes a main fixing plate and a subsidiary fixing plate having identical structures. The main fixing plate and the subsidiary fixing plate are disposed on the first and second shafts. Each of the main fixing plate and the subsidiary fixing plate has a base section for together pivotally connecting with the link unit.

40 Claims, 5 Drawing Sheets

(56) References Cited

U.S. PATENT DOCUMENTS

2014/0373654 A1* 12/2014 Hsu .................. G06F 1/1681
 74/96
2015/0047152 A1* 2/2015 Cheng ................ E05D 3/122
 16/354
2015/0159413 A1* 6/2015 Chen .................. G06F 1/1618
 16/342
2015/0173218 A1* 6/2015 Hsu .................... E05D 3/12
 16/366
2015/0189777 A1* 7/2015 Hsu .................. H05K 5/0226
 16/366

* cited by examiner

DUAL-SHAFT SYNCHRONOUS TRANSMISSION FIXING DEVICE

BACKGROUND OF THE INVENTION

1. Field of the Invention

The present invention relates generally to a dual-shaft synchronous transmission fixing device, and more particularly to a fixing device having a main fixing plate and a subsidiary fixing plate, which are assembled with the transmission mechanism to securely fix the transmission mechanism for stably transmitting power.

2. Description of the Related Art

There are various electronic apparatuses provided with covers or display screens, such as mobile phones, notebooks, PDA, and electronic books. The covers or display screens are pivotally mounted on the electronic apparatuses via pivot pins or rotary shafts, whereby the covers or display screens can be freely rotated and opened/closed under external force.

In order to operate the display module (such as the screen) and/or the apparatus body module of the electronic apparatus in more operation modes and application ranges, a dual-shaft mechanism is provided between the display module and the apparatus body module, whereby the display module and/or the apparatus body module can be operated in different operation modes by different rotational angles. For example, U.S. Pat. No. 7,512,426 B2 discloses a mobile communications device with synchronizing hinge.

In general, the dual-shaft mechanism employs a complicated fixing structure assembled with multiple gaskets with through holes and recessed/raised locating sections, frictional plates and springs assembled on the rotary shafts. Two ends of the rotary shafts are respectively fixed by means of retainer rings or fixing members. The springs cooperatively store and release energy to rotate and locate the rotary shafts. Basically, according to the above structural design and assembling process, the assembling time cannot be shortened so that the manufacturing cost is increased.

There is also a conventional mechanism composed of rollers and drive wires (or transmission belts) for transmitting force to the rotary shaft so as to rotate the rotary shaft. As known by those who are skilled in this field, during the operation process of the wires or the transmission belts, delay of kinetic energy transmission will take place. This is because there is a gap between the wires (or transmission belts) and the rollers and the wires (or transmission belts) will slip or untruly operate. Also, the wires (or transmission belts) are made of elastic material and the fixing structure for assembling the wires (or transmission belts) with the rollers is not ideal. As a result, in force transmission, the load on the wires or the pulling force applied to the wires will increase. In this case, the transmission and shift effect of the wires will be deteriorated. Also, the force of the wires or transmission belts, which is preset in the initial assembling process will decrease due to elastic failure. Under such circumstance, the synchronous movement effect of the transmission mechanism will be deteriorated.

In order to improve the above problems, a conventional dual-shaft synchronous movement device has been developed. Such dual-shaft synchronous movement device employs multiple gears for transmitting force. However, as known by those who are skilled in this field, with the transmission gears, the gap between the shafts of the dual-shaft synchronous movement device can be hardly minified. Therefore, the entire transmission unit or structure will occupy a considerably large space. Especially, when the transmission unit is applied to a notebook or a miniaturized electronic device, the electronic device can hardly meet the requirement for lightweight and slimmed design. This is not what we expect.

The conventional rotary shaft structures and the relevant connection components thereof have some shortcomings in use and structural design that need to be overcome. It is therefore tried by the applicant to provide a dual-shaft synchronous movement device and an assembling method thereof to eliminate the shortcomings existing in the conventional rotary shaft structure so as to widen the application range and facilitate the assembling process of the rotary shaft structure. For example, in precondition of synchronous move and easy operation, a fixing device is provided to enhance the stability and fixing effect of the rotary shaft structures and the relevant connection components. In addition, the gap between the shafts can be changed or adjusted according to the transmission specification so as to minify the space occupied by the entire transmission unit or structure. Also, the components can be truly engaged with each other without the problems of slippage and delay of kinetic energy transmission. Accordingly, when the transmission unit is applied to an electronic device, the electronic device can meet the requirement for lightweight and slimmed design.

SUMMARY OF THE INVENTION

It is therefore a primary object of the present invention to provide a dual-shaft synchronous transmission fixing device, which has a simplified structure and minified volume. The gap between the rotary shafts can be changed or adjusted according to the transmission specification so that the electronic device can be thinned and lightweight. The dual-shaft synchronous transmission fixing device includes a driver disposed on a first shaft and a reactor disposed on a second shaft and a link unit engaged with the driver and the reactor, whereby the first and second shafts can be synchronously rotated in reverse directions. The dual-shaft synchronous transmission fixing device further includes a main fixing plate and a subsidiary fixing plate having identical structures. The main fixing plate and the subsidiary fixing plate are disposed on the first and second shafts. Each of the main fixing plate and the subsidiary fixing plate has a base section for together pivotally connecting with the link unit so as to enhance the smoothness of rotation of the link unit and avoid the problems of skip and idling of the conventional synchronous transmission mechanism.

In the above dual-shaft synchronous transmission fixing device, each of the base sections of the main fixing plate and the subsidiary fixing plate has a first section and a second section. The first section of the main fixing plate is correspondingly assembled with the second section of the subsidiary fixing plate, while the second section of the main fixing plate is correspondingly assembled with the first section of the subsidiary fixing plate. The base sections of the main fixing plate and the subsidiary fixing plate are formed with grooves. A lubricant or the like can be filled in the grooves to keep the link unit more smoothly rotated between the base sections.

The present invention can be best understood through the following description and accompanying drawings, wherein:

DETAILED DESCRIPTION OF THE PREFERRED EMBODIMENTS

Figure 1:
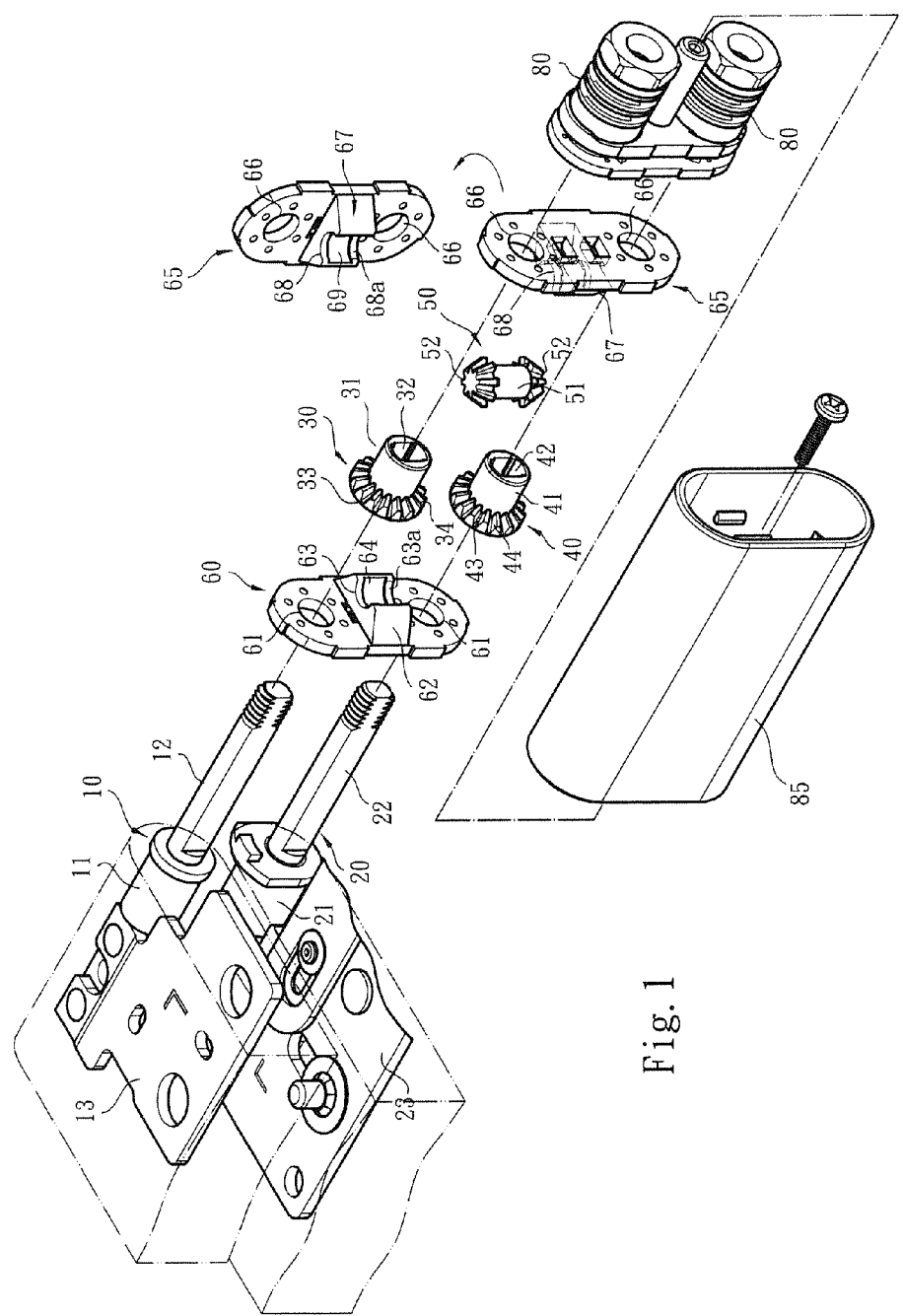
FIG. 1 is a perspective exploded view of a first embodiment of the present invention, in which the phantom lines show that an electronic apparatus is positioned in a closed position and show the relationship between the electronic apparatus and the first and second shafts.
Figure 2:
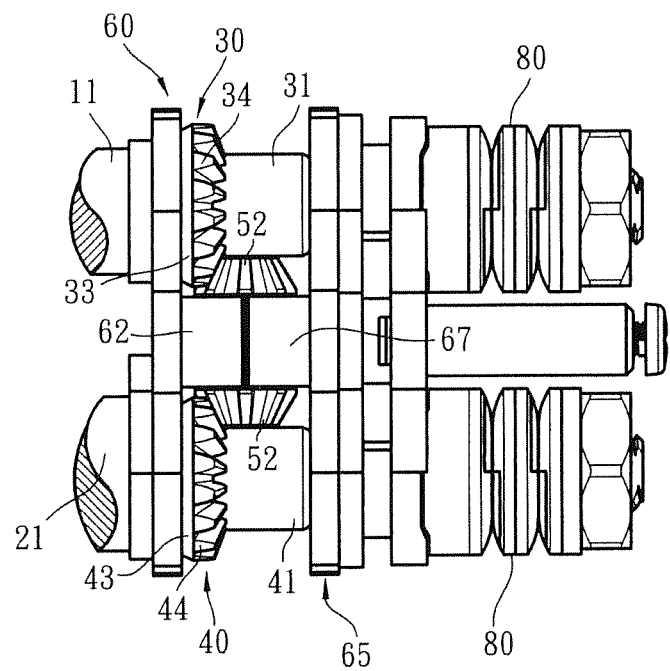
FIG. 2 is a side assembled view of the first embodiment of the present invention, showing the structural form of the first and second shafts, the driver, the link unit, the reactor, the main fixing plate, the subsidiary fixing plate and the torque modules.
Figure 3:
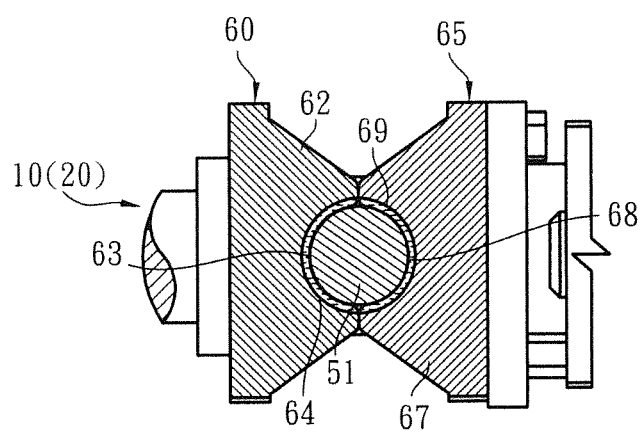
FIG. 3 is a sectional assembled view of the first embodiment of the present invention, showing that the shaft section of the link unit is pivotally held in the recesses of the main fixing plate and the subsidiary fixing plate.

Please refer to FIGS. 1, 2 and 3. The dual-shaft synchronous transmission fixing device of the present invention includes a first shaft 10 and a second shaft 20. Each of the first and second shafts 10, 20 has a fixed section 11, 21 and a pivoted section 12, 22. The fixed sections 11, 21 are assembled with fixing seats 13, 23 to respectively fix the first and second shafts 10, 20 on a display module 91 and an apparatus body module 92 of an electronic apparatus 90 (such as a mobile phone, a computer or the like). The pivoted sections 12, 22 of the first and second shafts 12, 22 are (respectively) assembled with torque modules 80. Accordingly, when the action force applied to the display module 91 or the apparatus body module 92 by a user for rotating the same disappears, the display module 91 and the apparatus body module 92 are immediately located.

As shown in FIGS. 1, 2 and 3, a synchronous transmission device and a fixing device assembled with the synchronous transmission device are disposed on the pivoted sections 12, 22 of the first and second shafts. The synchronous transmission device includes a driver 30 disposed on and assembled with the pivoted end 12 of the first shaft and drivable by or rotatable with the first shaft 10, a reactor 40 disposed on and assembled with the pivoted end 22 of the second shaft and drivable by or rotatable with the second shaft 20, and a link unit 50 disposed and connected between the driver 30 and the reactor 40. When the first shaft 10 drives the driver 30 to rotate, the driver 30 drives and rotates the link unit 50. At the same time, the link unit 50 drives the reactor 40 and the second shaft 20 to rotate in a direction reverse to the rotational direction of the driver 30. Accordingly, the first and second shafts 10, 20 can be synchronously rotated in reverse directions.

To speak more specifically, each of the driver 30 and the reactor 40 includes a shaft section 31, 41 in parallel to each other and a shaft hole 32, 42 formed on the shaft section 31, 41. The pivoted sections 12, 22 of the first and second shafts 10, 20 are fixedly fitted in the shaft holes 32, 42 of the driver 30 and the reactor 40. Accordingly, the driver 30 and the first shaft 10 and the reactor 40 and the second shaft 20 are synchronously rotatable. One end of the shaft section 31 of the driver 30 is provided with a disc 33. Also, one end of the shaft section 41 of the reactor 40 is provided with a disc 43. Each of the discs 33, 43 is formed with a crown gear structure 34, 44. The outer diameter of the disc 33 (or 43) is larger than the outer diameter of the shaft section 31 (or 41).

As shown in the drawings, the link unit 50 includes a shaft section 51 normal to the shaft sections 31, 41 of the driver 30 and the reactor 40. The link unit 50 has spur gear structures or bevel gear structures 52 at two ends of the shaft section 51 corresponding to the crown gear structures 34, 44 of the driver 30 and the reactor 40 for engaging with the crown gear structures 34, 44 of the driver 30 and the reactor 40.

In a preferred embodiment, the fixing device includes a main fixing plate 60 and a subsidiary fixing plate 65. The synchronous transmission device is disposed between the main fixing plate 60 and the subsidiary fixing plate 65. In case of allowance of conditions, the main fixing plate 60 and the subsidiary fixing plate 65 can have identical structure so that these two components can be manufactured with the same mold to lower the mold design and development cost. The upper and lower sections of the main fixing plate 60 and the subsidiary fixing plate 65 are respectively formed with perforations 61, 66. The first and second shafts 10, 20 are passed through the perforations 61, 66 to fit the main fixing plate 60 and the subsidiary fixing plate 65 on the first and second shafts 10, 20. Each of the main fixing plate 60 and the subsidiary fixing plate 65 has a mountain-shaped base section 62, 72. The base sections 62, 72 are normal to the main fixing plate 60 and the subsidiary fixing plate 65 for together pivotally connecting with the link unit 50, permitting the link unit 50 to rotate between the base sections 62, 67. The base sections 62, 67 are respectively positioned between the upper and lower perforations 61, 66.

To speak more specifically, each of the base sections 62, 67 of the main fixing plate 60 and the subsidiary fixing plate 65 has a recess 63, 68. The recesses 63, 68 of the base sections 62, 67 of the main fixing plate 60 and the subsidiary fixing plate 65 together form a circular hollow in which the shaft section 51 of the link unit 50 is non-fully or fully enclosed and held so that the shaft section 51 of the link unit 50 is pivotally connected between the main fixing plate 60 and the subsidiary fixing plate 65. The diameter of the shaft section 51 of the link unit 50 is equal to the width of the circular hollow. In addition, a groove 64, 69 is formed on each of the recesses 63, 68 of the base sections 62, 67 of the main fixing plate 60 and the subsidiary fixing plate 65. Contact faces or contact sections 63a, 68a are formed on the recess 63, 68 on two sides of the groove 64, 69.

It should be noted that when the shaft section 51 of the link unit 50 is pivotally held in the recesses 63, 68 of the base sections 62, 67, the shaft section 51 of the link unit 50 is pivotally connected between the contact sections 63a, 68a of the grooves 64, 69. This helps in reducing the contact area between the base sections 62, 67 (or the recesses 63, 68) and the shaft section 51 of the link unit 50 so as to reduce the frictional force against the move of the shaft section 51 of the link unit 50. In addition, a lubricant or the like can be filled in the grooves 64, 69 to keep the link unit 50 more smoothly rotated between the base sections 62, 67, whereby the lifetime of the components can be prolonged.

It should be noted that due to the base sections 62, 67 of the main fixing plate 60 and subsidiary fixing plate 65, the gap between the two shafts can be changed or adjusted according to the transmission specification such as the size of the link unit 50 or the shaft section 51 thereof). In this case, the electronic product can be thinned and lightweight. Moreover, the main fixing plate 60 and subsidiary fixing plate 65 restrict the driver 30 and the reactor 40 from freely axially moving. Under such circumstance, the driver 30 and the reactor 40 can be engaged with the link unit 50 without any gap. Also, the shaft section 51 of the link unit 50 is pivotally held and connected between the base sections 62, 67 (or the recesses 63, 68) so that the link unit 50 cannot freely axially move (left and right directions of FIG. 3) or freely radially move (up and down and forward and rearward directions of FIG. 3).

That is, the assembly of the driver 30, the reactor 40 and the link unit 50 can truly transmit the power and the possibility of skip, idling or rotational error is minimized.

In a preferred embodiment, the pivoted sections 12, 22 of the first and second shafts, the main fixing plate 60, the driver 30, the reactor 40, the link unit 50, the subsidiary fixing plate 65 and the torque modules 80 are all mounted in a case 85.

When a user operates the display module 91 to drive and rotate the first shaft 10 and the driver 30 from a closed position to an opened position, the crown gear structure 34 of the driver 30 drives and rotates the bevel gear structure 52 of the link unit 50. At the same time, the bevel gear structure 52 of the link unit 50 drives the crown gear structure 44 of the reactor 40 and the second shaft 20 to synchronously rotate. Therefore, the apparatus body module 92 is also rotated and opened relative to the display module 91. Accordingly, in the case that the display module 91, the first shaft 10 and the driver 30 are 180-degree rotated, the link unit 50 will drive the reactor 40, the second shaft 20 and the apparatus body module 92 to also 180-degree rotate.

Figure 4:
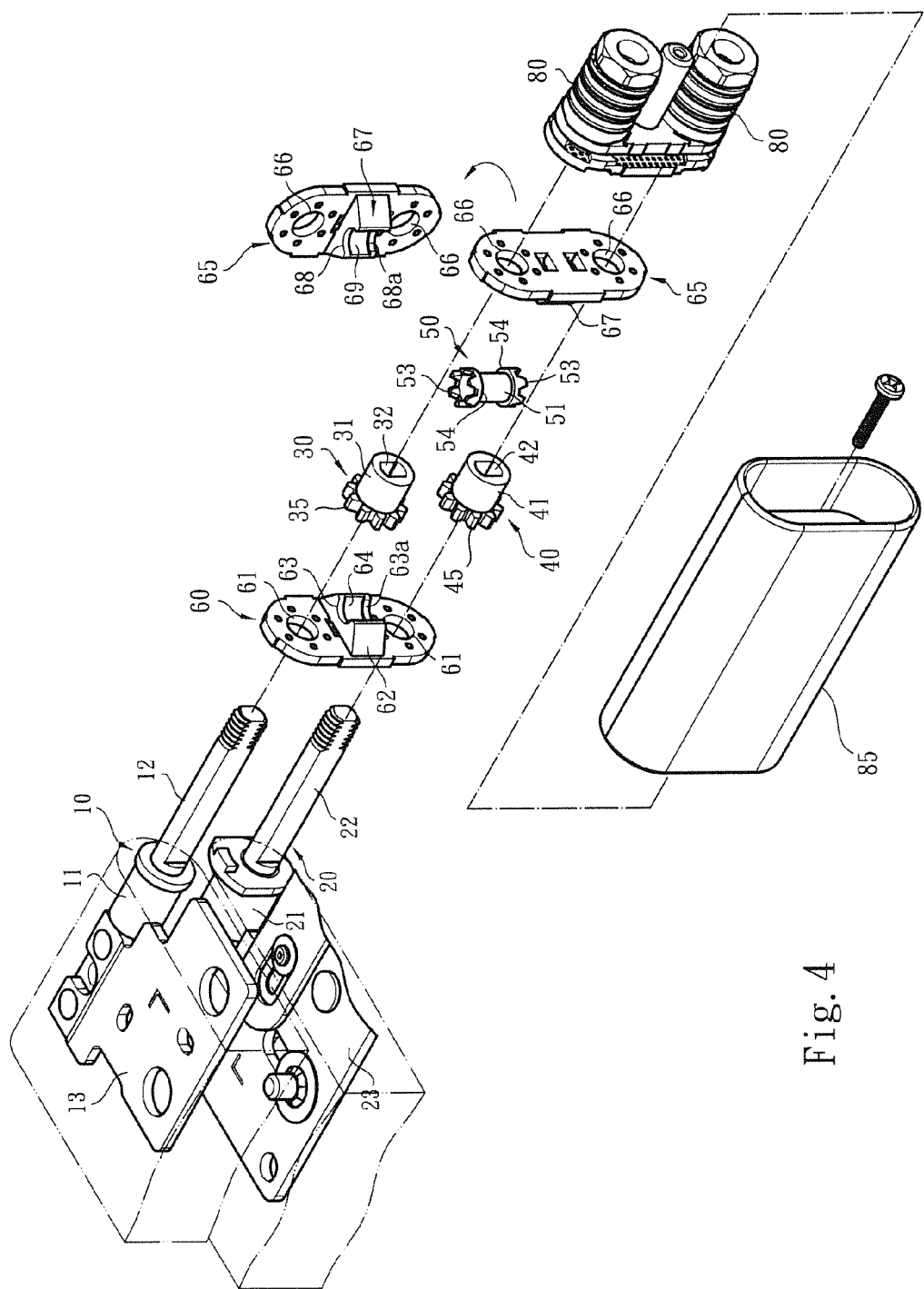
FIG. 4 is a perspective exploded view of a second embodiment of the present invention.

Please now refer to FIG. 4, which show a second embodiment of the present invention. In the second embodiment, a spur crown gear structure 35, 45 is formed at one end of each of the driver 30 and the reactor 40. The link unit 50 has crown gear structures 53 at two ends corresponding to the spur crown gear structures 35, 45 of the driver 30 and the reactor 40 for engaging with the spur crown gear structure 35, 45 of the driver 30 and the reactor 40.

In a modified embodiment, each of two ends of the link unit 50 is formed with a shoulder section 54. The crown gear structures 53 are disposed on the shoulder sections 54. The shoulder section 54 has a width or diameter larger than the width of diameter of the shaft section 51 of the link unit 50.

Figure 5:
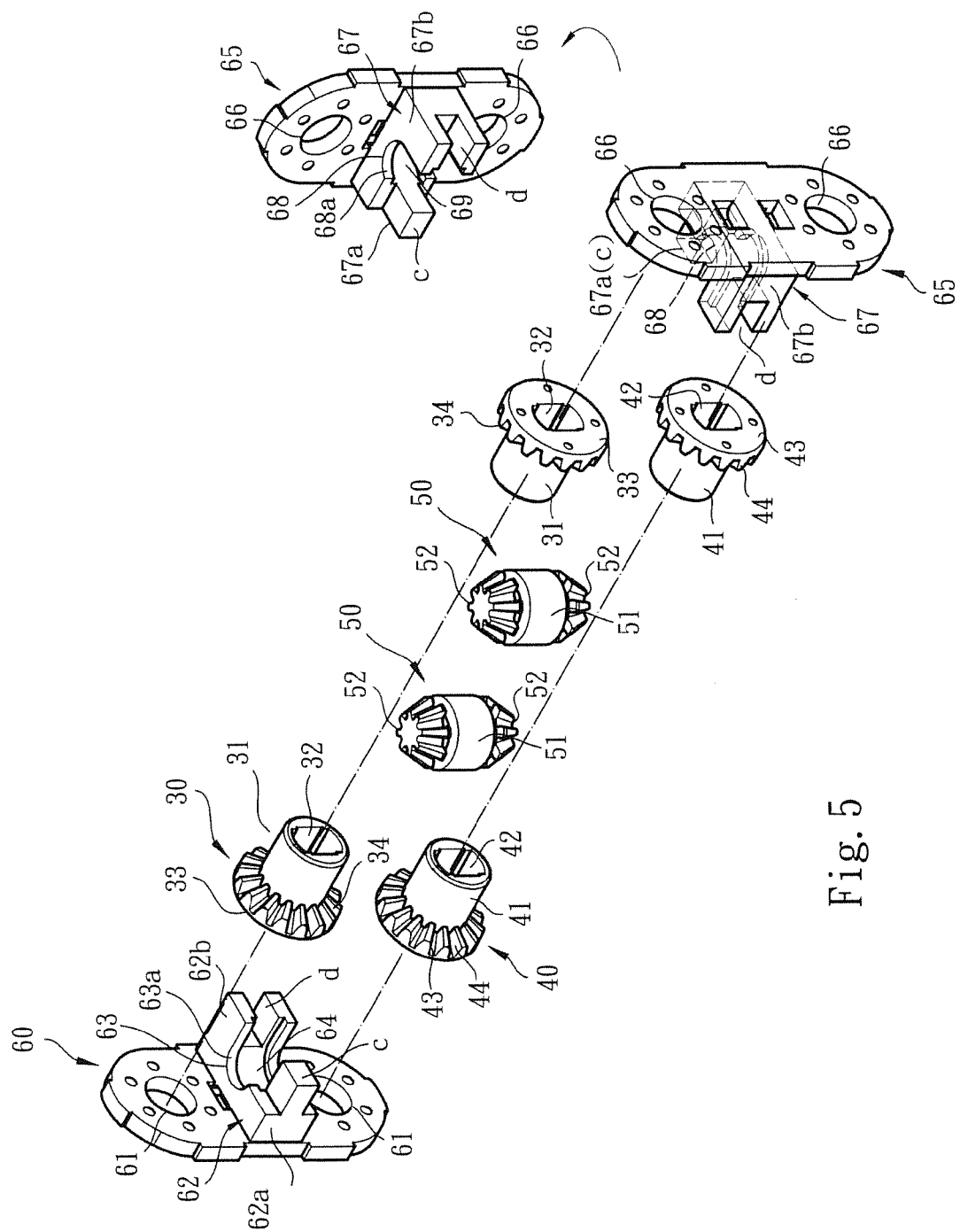
FIG. 5 is a perspective exploded view of a third embodiment of the present invention, showing that two driver are disposed on the first shaft and two reactors are disposed on the second shaft and two link units are respectively engaged with the drivers and the reactors and the base sections of the main and subsidiary fixing plates are formed with first and second sections.
Figure 6:
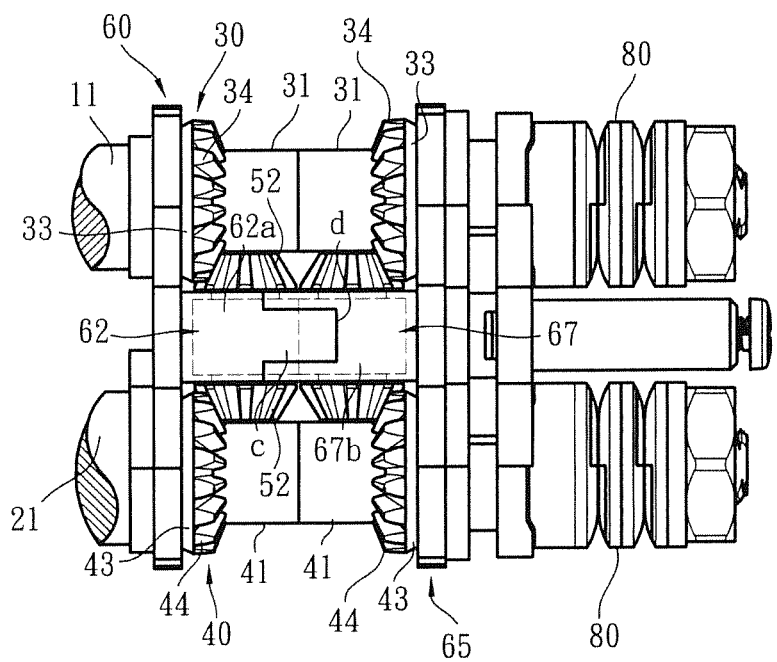
FIG. 6 is a side assembled view according to FIG. 5, showing that two drivers and two reactors are disposed between the main and subsidiary fixing plates and engaged with two link units.
Figure 7:
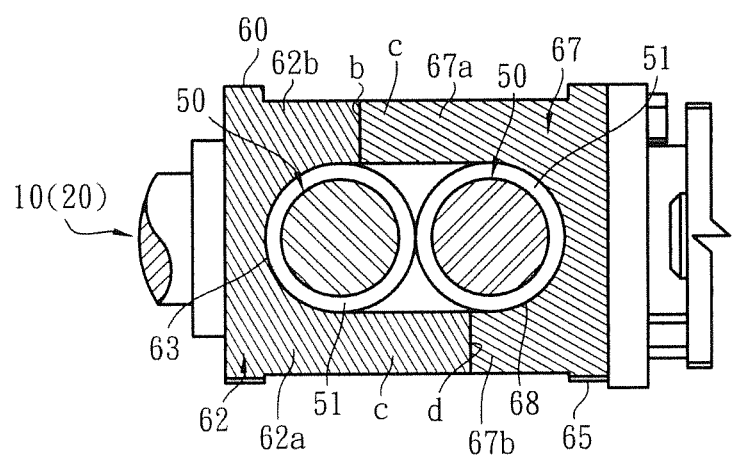
FIG. 7 is a sectional assembled view of the third embodiment of the present invention, showing that the shaft sections of the two link units are pivotally held in the recesses of the main fixing plate and the subsidiary fixing plate.

Please now refer to FIGS. 5, 6 and 7, which show a modified embodiment of the fixing device. Each of the base sections 62, 67 of the main fixing plate and the subsidiary fixing plate has a first section 62a, 67a and a second section 62b, 67b. The first section 62a of the main fixing plate is correspondingly assembled with the second section 67b of the subsidiary fixing plate, while the second section 62b of the main fixing plate is correspondingly assembled with the first section 67a of the subsidiary fixing plate. To speak more specifically, each of the first sections 62a, 67a of the main fixing plate and the subsidiary fixing plate is formed with a protrusion c and each of the second sections 62b, 67b of the main fixing plate and the subsidiary fixing plate is formed with a dent d. The protrusion c of the first section 62a of the main fixing plate is inserted and assembled in the dent d of the second section 67b of the subsidiary fixing plate, while the protrusion c of the first section 67a of the subsidiary fixing plate is correspondingly inserted in the dent d of the second section 62b of the main fixing plate. Such assembling structure can securely fix the driver 30, the reactor 40 and the link unit 50 and prevent the main and subsidiary fixing plates 60, 65 from deflecting when the synchronous transmission device is operated as shown in FIGS. 6 and 7.

In the embodiment of FIGS. 5, 6 and 7, the base sections 62, 67 (or the recesses 63, 68) of the main fixing plate 60 and the subsidiary fixing plate 65 together define an (elliptic) hollow in which the shaft sections 51 of two link units 50 are pivotally held. The two link units 50 are respectively engaged with two drivers 30 and two reactors 40. The two drivers 30 are mounted on the pivoted section 12 of the first shaft opposite to each other. The two reactors 40 are mounted on the pivoted sections 22 of the second shaft opposite to each other. Accordingly, when the first shaft 10 drives the two drivers 30 to rotate, the two drivers 30 respectively drive the two link units 50 to rotate. At this time, the two reactors 40 and the second shaft 20 are rotated in a direction reverse to the rotational direction of the drivers 30, whereby the first and second shafts 10, 20 are synchronously rotated.

In comparison with the shaft section 51 of the link unit of FIG. 1 or 4, the diameter of the shaft section 51 of the link unit of FIG. 5 is apparently larger than the diameter of the shaft section 51 of the link unit of FIG. 1 or 4. That is, the total of the diameters of the shaft sections 51 of the two link units of FIG. 5 is approximately equal to the width of the elliptic hollow defined by the recesses 63, 68 of the main fixing plate and the subsidiary fixing plate. Therefore, as shown in FIG. 7, the shaft sections 51 of the two link units 50 are in contact with each other. In this case, when the link units 50 are rotated with the drivers 30 and the reactors 40 to transmit power, the two shaft sections 51 are simultaneously simply rotated or rolled.

In comparison with the conventional device, the dual-shaft synchronous transmission fixing device of the present invention can be synchronously and conveniently operated and has the following advantages:

1. In the dual-shaft synchronous transmission device of the present invention, the spur gear structures 35, 45 are disposed on the shaft sections 31, 41 of the driver 30 and the reactor 40. Alternatively, the crown gear structures 34, 44 are disposed on the discs 33, 43. The crown gear structures 53 or the bevel gear structures 52 are disposed on the shaft section 51 of the link unit 50 for engaging with the spur gear structures 35, 45 or the crown gear structures 34, 44. The mountain-shaped base sections 62, 67 of the main fixing plate 60 and the subsidiary fixing plate 65 are formed with recesses 63, 68, contact sections 63a, 68a and grooves 64, 69, in which shaft section 51 of the link unit 50 is rotatably disposed. The first sections 62a, 67a are formed with protrusions c, while the second sections 62b, 67b are formed with dents d. The above components are assembled to form a fixing device. The components of the dual-shaft synchronous transmission device of the present invention are redesigned and are obviously different from the conventional device in which a complicated fixing structure is assembled with the wires (or transmission belts) and multiple gears are engaged with each other for rotating the rotary shafts to transmit power.

2. In the dual-shaft synchronous transmission device of the present invention, the driver 30, the reactor 40, the link unit 30, the main fixing plate 60 and the subsidiary fixing plate 65 are cooperatively assembled with each other to achieve a transmission effect. In comparison with the conventional device, the present invention is easy to manufacture and assemble. In addition, the fixing device can more securely fix the synchronous transmission device to enhance the stability of operation of the rotary shafts. Also, the gap between the first and second shafts can be changed or adjusted according to the transmission specification (such as the structural forms of FIGS. 3 and 7) to reduce the occupied room or the volume of the entire transmission device. This meets the requirements of lightweight, miniaturization and slimness of the electronic apparatus. Moreover, the fixing device can securely fix the assembly of the driver 30, the reactor 40 and the link unit 50 to truly transmit the power and the possibility of skip, idling or rotational error is minimized.

In conclusion, the dual-shaft synchronous transmission fixing device of the present invention is designed with a novel structure for effectively transmitting power and is advantageous over the conventional device.

The above embodiments are only used to illustrate the present invention, not intended to limit the scope thereof. Many modifications of the above embodiments can be made without departing from the spirit of the present invention.

What is claimed is:

1. A dual-shaft synchronous transmission fixing device, comprising:
   a first shaft having a fixed section and a pivoted section;
   a second shaft having a fixed section and a pivoted section;
   at least one driver disposed on the pivoted section of the first shaft;
   at least one reactor disposed on the pivoted section of the second shaft;
   at least one link unit engaged with the driver and the reactor for synchronously rotating the first and second shaft; and
   a fixing device including a main fixing plate and a subsidiary fixing plate disposed on the first and second shafts, each of the main fixing plate and the subsidiary fixing plate having a base section, the base sections of the main fixing plate and the subsidiary fixing plate being oppositely assembled with each other, each of the base sections being formed with a recess, the recesses of the base sections together pivotally holding a shaft section of the link unit to pivotally connect the shaft section of the link unit between the base sections of the main fixing plate and the subsidiary fixing plate, permitting the link unit to freely rotate.

2. The dual-shaft synchronous transmission fixing device as claimed in claim 1, wherein the main fixing plate and the subsidiary fixing plate have identical structures.

3. The dual-shaft synchronous transmission fixing device as claimed in claim 1, wherein upper and lower sections of the main fixing plate and upper and lower sections of the subsidiary fixing plate are respectively formed with perforations, the pivoted sections of the first and second shafts being passed through the perforations to fit the main fixing plate and the subsidiary fixing plate on the first and second shafts, the driver, the reactor and the link unit being positioned between the main fixing plate and the subsidiary fixing plate, the base sections being normal to the main fixing plate and the subsidiary fixing plate, the recesses of the base sections of the main fixing plate and the subsidiary fixing plate together forming a hollow in which the shaft section of the link unit is pivotally connected, a groove being formed on each of the recesses of the base sections of the main fixing plate and the subsidiary fixing plate, contact sections being formed on the recess on two sides of the groove.

4. The dual-shaft synchronous transmission fixing device as claimed in claim 3, wherein the recesses of the base sections of the main fixing plate and the subsidiary fixing plate together form a circular hollow, the contact sections of the recess of the main fixing plate and the contact sections of the recess of the subsidiary fixing plate being in contact with the shaft section of the link unit to together pivotally connect with the shaft section of the link unit, the shaft section of the link unit having a diameter equal to a width of the circular hollow.

5. The dual-shaft synchronous transmission fixing device as claimed in claim 1, wherein each of the base sections of the main fixing plate and the subsidiary fixing plate has a first section and a second section, each of the first sections of the main fixing plate and the subsidiary fixing plate being formed with a protrusion and each of the second sections of the main fixing plate and the subsidiary fixing plate being formed with a dent, the protrusion of the first section of the main fixing plate being assembled with the dent of the second section of the subsidiary fixing plate, while the protrusion of the first section of the subsidiary fixing plate being correspondingly assembled with the dent of the second section of the main fixing plate.

6. The dual-shaft synchronous transmission fixing device as claimed in claim 2, wherein each of the base sections of the main fixing plate and the subsidiary fixing plate has a first section and a second section, each of the first sections of the main fixing plate and the subsidiary fixing plate being formed with a protrusion and each of the second sections of the main fixing plate and the subsidiary fixing plate being formed with a dent, the protrusion of the first section of the main fixing plate being assembled with the dent of the second section of the subsidiary fixing plate, while the protrusion of the first section of the subsidiary fixing plate being correspondingly assembled with the dent of the second section of the main fixing plate.

7. The dual-shaft synchronous transmission fixing device as claimed in claim 3, wherein each of the base sections of the main fixing plate and the subsidiary fixing plate has a first section and a second section, each of the first sections of the main fixing plate and the subsidiary fixing plate being formed with a protrusion and each of the second sections of the main fixing plate and the subsidiary fixing plate being formed with a dent, the protrusion of the first section of the main fixing plate being assembled with the dent of the second section of the subsidiary fixing plate, while the protrusion of the first section of the subsidiary fixing plate being correspondingly assembled with the dent of the second section of the main fixing plate.

8. The dual-shaft synchronous transmission fixing device as claimed in claim 5, wherein the recesses of the base sections of the main fixing plate and the subsidiary fixing plate together form an elliptic hollow in which the shaft sections of two link units are pivotally connected, the two link units being respectively engaged with two drivers and two reactors, the drivers being oppositely mounted on the pivoted section of the first shaft, while the two reactors being oppositely mounted on the pivoted section of the second shaft, the two drivers respectively driving the two link units to rotate to make the two reactors rotate in a direction reverse to a rotational direction of the drivers.

9. The dual-shaft synchronous transmission fixing device as claimed in claim 7, wherein the recesses of the base sections of the main fixing plate and the subsidiary fixing plate together form an elliptic hollow in which the shaft sections of two link units are pivotally connected, the two link units being respectively engaged with two drivers and two reactors, the drivers being oppositely mounted on the pivoted section of the first shaft, while the two reactors being oppositely mounted on the pivoted section of the second shaft, the two drivers respectively driving the two link units to rotate to make the two reactors rotate in a direction reverse to a rotational direction of the drivers.

10. The dual-shaft synchronous transmission fixing device as claimed in claim 8, wherein the total of the diameters of the shaft sections of the two link units is equal to the width of the elliptic hollow defined by the recesses of the main fixing plate and the subsidiary fixing plate, the shaft sections of the two link units being in contact with each other.

11. The dual-shaft synchronous transmission fixing device as claimed in claim 1, wherein each of the driver and the reactor includes a shaft section in parallel to each other and a shaft hole formed on the shaft section, the pivoted sections of the first and second shafts being fixedly fitted in the shaft holes of the driver and the reactor, one end of the shaft section of the driver being provided with a disc, one end of the shaft section of the reactor being also provided with a disc, each of the discs being formed with a crown gear structure, an outer diameter of the disc being larger than an outer diameter of the shaft section, the shaft section of the link unit being normal to the shaft sections of the driver and the reactor, the link unit having spur gear structures or bevel gear structures at two ends of the shaft section corresponding to the crown gear structures of the driver and the reactor for engaging with the crown gear structures of the driver and the reactor.

12. The dual-shaft synchronous transmission fixing device as claimed in claim 2, wherein each of the driver and the reactor includes a shaft section in parallel to each other and a shaft hole formed on the shaft section, the pivoted sections of the first and second shafts being fixedly fitted in the shaft holes of the driver and the reactor, one end of the shaft section of the driver being provided with a disc, one end of the shaft section of the reactor being also provided with a disc, each of the discs being formed with a crown gear structure, an outer diameter of the disc being larger than an outer diameter of the shaft section, the shaft section of the link unit being normal to the shaft sections of the driver and the reactor, the link unit having spur gear structures or bevel gear structures at two ends of the shaft section corresponding to the crown gear structures of the driver and the reactor for engaging with the crown gear structures of the driver and the reactor.

13. The dual-shaft synchronous transmission fixing device as claimed in claim 3, wherein each of the driver and the reactor includes a shaft section in parallel to each other and a shaft hole formed on the shaft section, the pivoted sections of the first and second shafts being fixedly fitted in the shaft holes of the driver and the reactor, one end of the shaft section of the driver being provided with a disc, one end of the shaft section of the reactor being also provided with a disc, each of the discs being formed with a crown gear structure, an outer diameter of the disc being larger than an outer diameter of the shaft section, the shaft section of the link unit being normal to the shaft sections of the driver and the reactor, the link unit having spur gear structures or bevel gear structures at two ends of the shaft section corresponding to the crown gear structures of the driver and the reactor for engaging with the crown gear structures of the driver and the reactor.

14. The dual-shaft synchronous transmission fixing device as claimed in claim 5, wherein each of the driver and the reactor includes a shaft section in parallel to each other and a shaft hole formed on the shaft section, the pivoted sections of the first and second shafts being fixedly fitted in the shaft holes of the driver and the reactor, one end of the shaft section of the driver being provided with a disc, one end of the shaft section of the reactor being also provided with a disc, each of the discs being formed with a crown gear structure, an outer diameter of the disc being larger than an outer diameter of the shaft section, the shaft section of the link unit being normal to the shaft sections of the driver and the reactor, the link unit having spur gear structures or bevel gear structures at two ends of the shaft section corresponding to the crown gear structures of the driver and the reactor for engaging with the crown gear structures of the driver and the reactor.

15. The dual-shaft synchronous transmission fixing device as claimed in claim 7, wherein each of the driver and the reactor includes a shaft section in parallel to each other and a shaft hole formed on the shaft section, the pivoted sections of the first and second shafts being fixedly fitted in the shaft holes of the driver and the reactor, one end of the shaft section of the driver being provided with a disc, one end of the shaft section of the reactor being also provided with a disc, each of the discs being formed with a crown gear structure, an outer diameter of the disc being larger than an outer diameter of the shaft section, the shaft section of the link unit being normal to the shaft sections of the driver and the reactor, the link unit having spur gear structures or bevel gear structures at two ends of the shaft section corresponding to the crown gear structures of the driver and the reactor for engaging with the crown gear structures of the driver and the reactor.

16. The dual-shaft synchronous transmission fixing device as claimed in claim 8, wherein each of the driver and the reactor includes a shaft section in parallel to each other and a shaft hole formed on the shaft section, the pivoted sections of the first and second shafts being fixedly fitted in the shaft holes of the driver and the reactor, one end of the shaft section of the driver being provided with a disc, one end of the shaft section of the reactor being also provided with a disc, each of the discs being formed with a crown gear structure, an outer diameter of the disc being larger than an outer diameter of the shaft section, the shaft section of the link unit being normal to the shaft sections of the driver and the reactor, the link unit having spur gear structures or bevel gear structures at two ends of the shaft section corresponding to the crown gear structures of the driver and the reactor for engaging with the crown gear structures of the driver and the reactor.

17. The dual-shaft synchronous transmission fixing device as claimed in claim 1, wherein each of the driver and the reactor includes a shaft section in parallel to each other and a shaft hole formed on the shaft section, the pivoted sections of the first and second shafts being fixedly fitted in the shaft holes of the driver and the reactor, one end of the shaft section of the driver being provided with a spur gear structure, one end of the shaft section of the reactor being also provided with a spur gear structure, the shaft section of the link unit being normal to the shaft sections of the driver and the reactor, the link unit having crown gear structures at two ends of the shaft section corresponding to the spur gear structures of the driver and the reactor for engaging with the spur gear structures of the driver and the reactor.

18. The dual-shaft synchronous transmission fixing device as claimed in claim 2, wherein each of the driver and the reactor includes a shaft section in parallel to each other and a shaft hole formed on the shaft section, the pivoted sections of the first and second shafts being fixedly fitted in the shaft holes of the driver and the reactor, one end of the shaft section of the driver being provided with a spur gear structure, one end of the shaft section of the reactor being also provided with a spur gear structure, the shaft section of the link unit being normal to the shaft sections of the driver and the reactor, the link unit having crown gear structures at two ends of the shaft section corresponding to the spur gear structures of the driver and the reactor for engaging with the spur gear structures of the driver and the reactor.

19. The dual-shaft synchronous transmission fixing device as claimed in claim 3, wherein each of the driver and the reactor includes a shaft section in parallel to each other and a shaft hole formed on the shaft section, the pivoted sections of the first and second shafts being fixedly fitted in the shaft holes of the driver and the reactor, one end of the shaft section of the driver being provided with a spur gear structure, one end of the shaft section of the reactor being also provided with a spur gear structure, the shaft section of the link unit being normal to the shaft sections of the driver and the reactor, the link unit having crown gear structures at two ends of the shaft section corresponding to the spur gear structures of the driver and the reactor for engaging with the spur gear structures of the driver and the reactor.

20. The dual-shaft synchronous transmission fixing device as claimed in claim 5, wherein each of the driver and the reactor includes a shaft section in parallel to each other and a shaft hole formed on the shaft section, the pivoted sections of the first and second shafts being fixedly fitted in the shaft holes of the driver and the reactor, one end of the shaft section of the driver being provided with a spur gear structure, one end of the shaft section of the reactor being also provided with a spur gear structure, the shaft section of the link unit being normal to the shaft sections of the driver and the reactor, the link unit having crown gear structures at two ends of the shaft section corresponding to the spur gear structures of the driver and the reactor for engaging with the spur gear structures of the driver and the reactor.

21. The dual-shaft synchronous transmission fixing device as claimed in claim 7, wherein each of the driver and the reactor includes a shaft section in parallel to each other and a shaft hole formed on the shaft section, the pivoted sections of the first and second shafts being fixedly fitted in the shaft holes of the driver and the reactor, one end of the shaft section of the driver being provided with a spur gear structure, one end of the shaft section of the reactor being also provided with a spur gear structure, the shaft section of the link unit being normal to the shaft sections of the driver and the reactor, the link unit having crown gear structures at two ends of the shaft section corresponding to the spur gear structures of the driver and the reactor for engaging with the spur gear structures of the driver and the reactor.

22. The dual-shaft synchronous transmission fixing device as claimed in claim 8, wherein each of the driver and the reactor includes a shaft section in parallel to each other and a shaft hole formed on the shaft section, the pivoted sections of the first and second shafts being fixedly fitted in the shaft holes of the driver and the reactor, one end of the shaft section of the driver being provided with a spur gear structure, one end of the shaft section of the reactor being also provided with a spur gear structure, the shaft section of the link unit being normal to the shaft sections of the driver and the reactor, the link unit having crown gear structures at two ends of the shaft section corresponding to the spur gear structures of the driver and the reactor for engaging with the spur gear structures of the driver and the reactor.

23. The dual-shaft synchronous transmission fixing device as claimed in claim 11, wherein each of the driver and the reactor includes a shaft section in parallel to each other and a shaft hole formed on the shaft section, the pivoted sections of the first and second shafts being fixedly fitted in the shaft holes of the driver and the reactor, one end of the shaft section of the driver being provided with a spur gear structure, one end of the shaft section of the reactor being also provided with a spur gear structure, the shaft section of the link unit being normal to the shaft sections of the driver and the reactor, the link unit having crown gear structures at two ends of the shaft section corresponding to the spur gear structures of the driver and the reactor for engaging with the spur gear structures of the driver and the reactor.

24. The dual-shaft synchronous transmission fixing device as claimed in claim 1, wherein each of the pivoted sections of the first and second shafts is assembled with a torque module, the pivoted sections of the first and second shafts, the main fixing plate, the driver, the reactor, the link unit, the subsidiary fixing plate and the torque modules being mounted in a case, the fixed sections of the first and second shafts being assembled with fixing seats to respectively fix the first and second shafts on a display module and an apparatus body module of an electronic apparatus.

25. The dual-shaft synchronous transmission fixing device as claimed in claim 2, wherein each of the pivoted sections of the first and second shafts is assembled with a torque module, the pivoted sections of the first and second shafts, the main fixing plate, the driver, the reactor, the link unit, the subsidiary fixing plate and the torque modules being mounted in a case, the fixed sections of the first and second shafts being assembled with fixing seats to respectively fix the first and second shafts on a display module and an apparatus body module of an electronic apparatus.

26. The dual-shaft synchronous transmission fixing device as claimed in claim 3, wherein each of the pivoted sections of the first and second shafts is assembled with a torque module, the pivoted sections of the first and second shafts, the main fixing plate, the driver, the reactor, the link unit, the subsidiary fixing plate and the torque modules being mounted in a case, the fixed sections of the first and second shafts being assembled with fixing seats to respectively fix the first and second shafts on a display module and an apparatus body module of an electronic apparatus.

27. The dual-shaft synchronous transmission fixing device as claimed in claim 5, wherein each of the pivoted sections of the first and second shafts is assembled with a torque module, the pivoted sections of the first and second shafts, the main fixing plate, the driver, the reactor, the link unit, the subsidiary fixing plate and the torque modules being mounted in a case, the fixed sections of the first and second shafts being assembled with fixing seats to respectively fix the first and second shafts on a display module and an apparatus body module of an electronic apparatus.

28. The dual-shaft synchronous transmission fixing device as claimed in claim 7, wherein each of the pivoted sections of the first and second shafts is assembled with a torque module, the pivoted sections of the first and second shafts, the main fixing plate, the driver, the reactor, the link unit, the subsidiary fixing plate and the torque modules being mounted in a case, the fixed sections of the first and second shafts being assembled with fixing seats to respectively fix the first and second shafts on a display module and an apparatus body module of an electronic apparatus.

29. The dual-shaft synchronous transmission fixing device as claimed in claim 8, wherein each of the pivoted sections of the first and second shafts is assembled with a torque module, the pivoted sections of the first and second shafts, the main fixing plate, the driver, the reactor, the link unit, the subsidiary fixing plate and the torque modules being mounted in a case, the fixed sections of the first and second shafts being assembled with fixing seats to respectively fix the first and second shafts on a display module and an apparatus body module of an electronic apparatus.

30. The dual-shaft synchronous transmission fixing device as claimed in claim 11, wherein each of the pivoted sections of the first and second shafts is assembled with a torque module, the pivoted sections of the first and second shafts, the main fixing plate, the driver, the reactor, the link unit, the subsidiary fixing plate and the torque modules being mounted in a case, the fixed sections of the first and second shafts being assembled with fixing seats to respectively fix the first and second shafts on a display module and an apparatus body module of an electronic apparatus.

31. The dual-shaft synchronous transmission fixing device as claimed in claim 17, wherein each of the pivoted sections of the first and second shafts is assembled with a torque module, the pivoted sections of the first and second shafts, the main fixing plate, the driver, the reactor, the link unit, the subsidiary fixing plate and the torque modules being mounted in a case, the fixed sections of the first and second shafts being assembled with fixing seats to respectively fix the first and second shafts on a display module and an apparatus body module of an electronic apparatus.

32. The dual-shaft synchronous transmission fixing device as claimed in claim 1, wherein the base section is a mountain-shaped structure.

33. The dual-shaft synchronous transmission fixing device as claimed in claim 2, wherein the base section is a mountain-shaped structure.

34. The dual-shaft synchronous transmission fixing device as claimed in claim 11, wherein the base section is a mountain-shaped structure.

35. The dual-shaft synchronous transmission fixing device as claimed in claim 17, wherein the base section is a mountain-shaped structure.

36. The dual-shaft synchronous transmission fixing device as claimed in claim 24, wherein the base section is a mountain-shaped structure.

37. The dual-shaft synchronous transmission fixing device as claimed in claim 1, wherein the opposite recesses of the base sections of the main fixing plate and the subsidiary fixing plate together non-fully enclose and hold the shaft section of the link unit.

38. The dual-shaft synchronous transmission fixing device as claimed in claim 2, wherein the opposite recesses of the base sections of the main fixing plate and the subsidiary fixing plate together non-fully enclose and hold the shaft section of the link unit.

39. The dual-shaft synchronous transmission fixing device as claimed in claim 1, wherein the opposite recesses of the base sections of the main fixing plate and the subsidiary fixing plate together fully enclose and hold the shaft section of the link unit.

40. The dual-shaft synchronous transmission fixing device as claimed in claim 2, wherein the opposite recesses of the base sections of the main fixing plate and the subsidiary fixing plate together fully enclose and hold the shaft section of the link unit.

* * * * *